(12) United States Patent
Song

(10) Patent No.: US 11,774,566 B2
(45) Date of Patent: *Oct. 3, 2023

(54) LIDAR DEVICE WITH A DYNAMIC SPATIAL FILTER

(71) Applicant: Liturex (Guangzhou) Co. Ltd, Guangzhou (CN)

(72) Inventor: Yunpeng Song, San Ramon, CA (US)

(73) Assignee: Liturex (Guangzhou) Co. Ltd, Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,114

(22) Filed: Nov. 16, 2022

(65) Prior Publication Data

US 2023/0079240 A1    Mar. 16, 2023

Related U.S. Application Data

(63) Continuation of application No. 16/375,788, filed on Apr. 4, 2019, now Pat. No. 11,573,304.

(60) Provisional application No. 62/663,929, filed on Apr. 27, 2018.

(51) Int. Cl.
   *G01S 7/486*     (2020.01)
   *G01S 7/4863*    (2020.01)
   *G01S 7/481*     (2006.01)

(52) U.S. Cl.
   CPC .......... *G01S 7/4868* (2013.01); *G01S 7/4817* (2013.01); *G01S 7/4863* (2013.01)

(58) Field of Classification Search
   CPC .... G01S 7/4868; G01S 7/4863; G01S 7/4817; G01S 7/4816; G01S 7/484; G01S 7/486; G01S 17/66; G01S 7/48

USPC .................................. 356/501, 5.01
See application file for complete search history.

(56) References Cited

U.S. PATENT DOCUMENTS

| | | | |
|---|---|---|---|
| 4,286,328 A | 8/1981 | Bocker | |
| 10,061,111 B2 | 8/2018 | Hillman | |
| 11,573,304 B2* | 2/2023 | Song | G01S 7/4817 |
| 2006/0291031 A1 | 12/2006 | Boehm et al. | |
| 2015/0357360 A1 | 12/2015 | Tian et al. | |
| 2018/0106900 A1 | 4/2018 | Droz et al. | |
| 2019/0064355 A1 | 2/2019 | Pacala et al. | |

\* cited by examiner

*Primary Examiner* — Daniel L Murphy
(74) *Attorney, Agent, or Firm* — Xuezhen Tian; VLP Law Group LLP

(57) ABSTRACT

Embodiments of the invention disclose devices, methods, and computer media for noise rejections in a remote sensing device, such as a LIDAR device. In an exemplary embodiment, a spatial filter includes an aperture dynamically created in synchronization with one or more directions in which emitted laser pulses from the LiDAR device are steered. Photons from all other directions except the one or more directions are blocked by the spatial filter. Reflected photons from the one or more directions pass through the spatial filter via the aperture, and are projected on one or more sets of photodetectors. Noises in the photons that pass through the spatial filter are further to be rejected based on one or more fixed temporal patterns identified in laser pulses emitted by the LiDAR device. The spatial filter can be implemented using an electrochromic display, an array of micromechanical (MEMS) mirrors, a liquid crystal display (LCD), or an electro-wetting display.

20 Claims, 9 Drawing Sheets

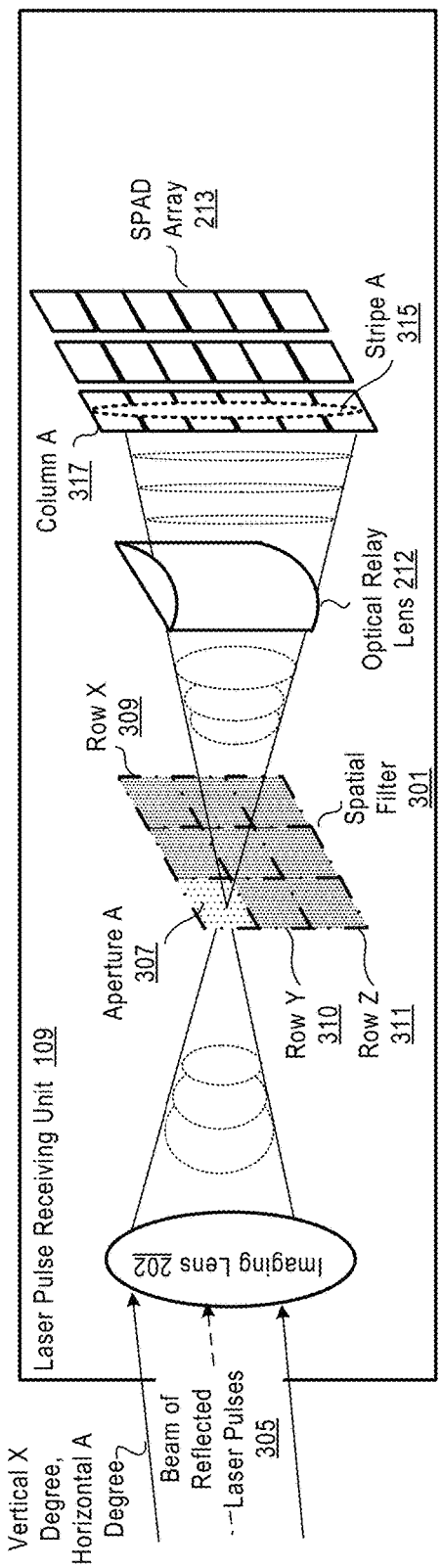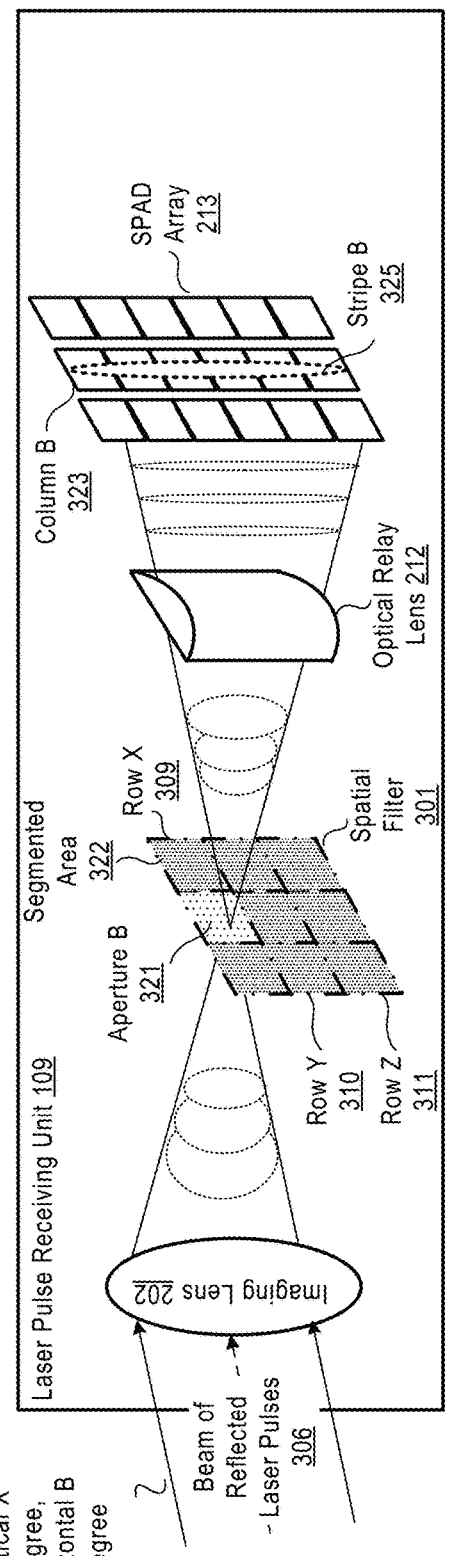
FIG. 3A
FIG. 3B

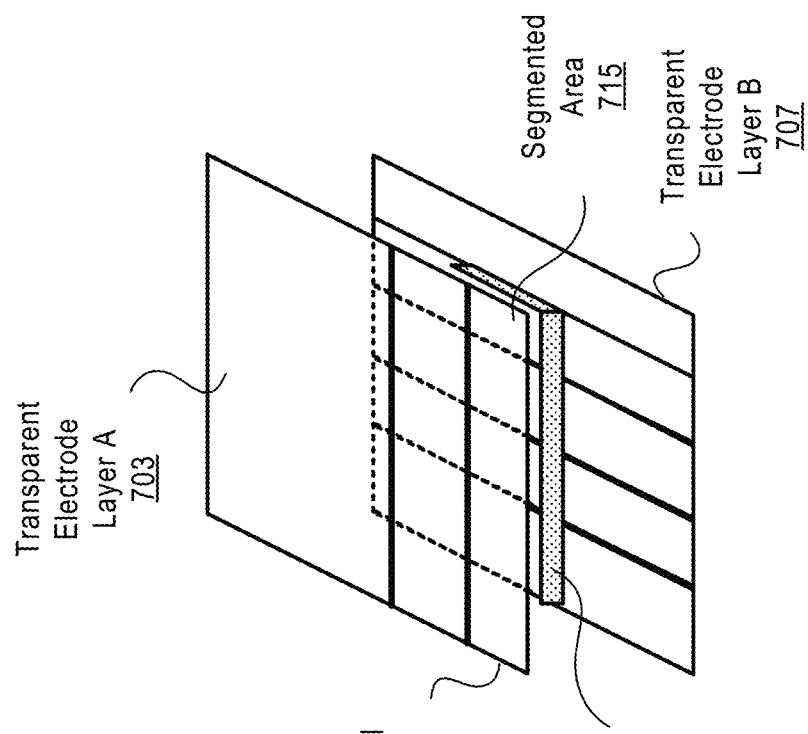
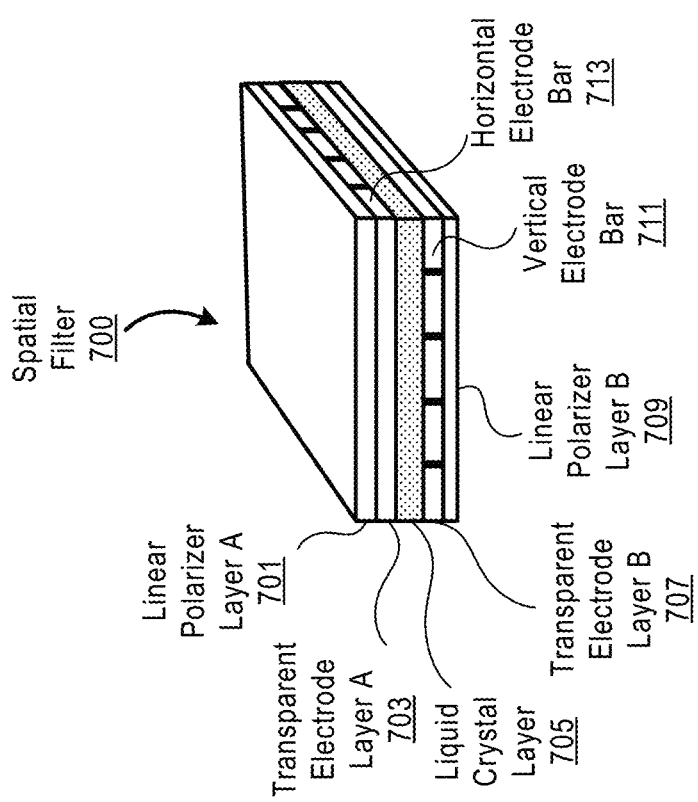
FIG. 7B
FIG. 7A

LIDAR DEVICE WITH A DYNAMIC SPATIAL FILTER

CLAIM OF PRIORITY

This application is a continuation of U.S. patent application Ser. No. 16/375,788, filed Apr. 4, 2019, which claims the benefit of priority to U.S. Provisional Application No. 62/663,929, titled "METHOD FOR EXTENDING RANGE AND SENSITIVITY OF SOLID STATE LIDAR SYSTEM AND APPARATUS THEREFOR", filed Apr. 27, 2018. The disclosure of the aforementioned applications is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the present invention relate generally to remote sensing, and more particularly relate to a light detection and ranging (LiDAR) device.

BACKGROUND

A LiDAR device can measure distances to objects in an environment by illuminating the objects with laser pulses and measuring reflected pulses from the objects. In many applications, long-range LiDAR devices are desirable. For example, a long-range LiDAR device can increase the safety of an autonomous driving vehicle by providing sufficient time for the vehicle to slow down to avoid obstacles on a highway.

The detection range of a LiDAR device is primarily determined by the relative intensity of signals and noises in the LiDAR device. Since the power of a laser emitter used in a LiDAR device is regulated due to safety concerns, ambient light reaching a photodetector in the LiDAR device can generate noises to overshadow reflected laser pulse signals reaching the photodetector, thereby preventing the LiDAR device from detecting objects at a long distance. The amount of laser pulse signals and noises in a LiDAR device can be measured by a signal-to-noise ratio (SNR).

Existing techniques of rejecting noises to increase SNRs of LiDAR devices typically are over-costly, lack desired performance, or are inapplicable to solid state LiDAR devices.

SUMMARY

Various embodiments of the invention can be used to improve detection ranges of a LiDAR device by improving its SNR using a dynamic spatial filter. Although a solid state LiDAR device is described as an illustrative environment in which the dynamic spatial filter can be implemented and used, it would be appreciated that the various embodiments in this disclosure can be similarly implemented in one or more other types of remote sensing devices.

According to a first aspect of the invention, a LiDAR device is provided that includes a laser pulse scanner to steer laser pulses in one or more directions; a plurality of photodetectors; a spatial filter positioned before the plurality of photodetectors; and a controlling unit. The controlling unit can dynamically create an aperture on the spatial filter based on the one or more directions, the aperture enabling photons reflected from the one or more directions to pass through the spatial filter via the dynamically created aperture. The photons that pass through the spatial filter are directed to one or more sets of photodetectors in the plurality of photodetectors.

In one embodiment of the LiDAR device according to the first aspect, the controlling unit can use one or more temporal patterns specific to laser pulses emitted by the LiDAR devices to reject noises from the photons that pass through the spatial filter, to further increase the relative strength of the signals of the LiDAR device.

In one embodiment of the LiDAR device according to the first aspect, the spatial filter is implemented using a liquid crystal display (LCD) with multiple rows of segmented areas. Each segmented area corresponds to a steering direction of the laser pulse scanner. A row of segmented areas of the spatial filter can be turned on and change from a low optical transmission area to a high optical transmission area. The row of segmented areas that are turned on can constitute an aperture corresponding to a current vertical steering angle, and can be turned off after the laser pulse scanner starts to steer laser pulses at a different vertical angle. In this implementation, the laser pulse scanner steers laser pulses vertically only across multiple vertical steering angles. The photodetectors are arranged into a two-dimensional pixel array and each of the plurality of photodetectors can be a single-photon avalanche diode (SPAD). Reflected photons that pass through the aperture are to be incident on multiple columns of the two-dimensional pixel array and are further to be processed by the controlling unit, which is to reject noises in the photons based on one or more fixed temporal patterns specific to laser pulses emitted by the LiDAR device.

In one embodiment of the LiDAR device according to the first aspect, the spatial filter is implemented using a liquid crystal display (LCD) with multiple rows of segmented areas. Each segmented area corresponds to a steering direction of the laser pulse scanner, and can be changed from a low optical transmission area to a high optical transmission area to constitute an aperture that corresponds to a current steering direction of the LiDAR device. The aperture is to be turned off after the laser pulse scanner starts to steer laser pulses in a different direction. In this implementation, the laser pulse scanner steers laser pulses both vertically and horizontally. The photodetectors are arranged into a two-dimensional pixel array and each of the plurality of photodetectors can be a single-photon avalanche diode (SPAD). Reflected photons that pass through the aperture are to be incident on one of a plurality of columns of the two-dimensional pixel array and are further to be processed by the controlling unit, which is to reject noises in the photons based on one or more fixed temporal patterns specific to laser pulses emitted by the LiDAR device.

In one embodiment of the LiDAR device according to the first aspect, the spatial filter is implemented using a two-dimensional array of digital mirrors, e.g., MEMS mirrors. Each MEMS mirror can correspond to a pixel and to a steering direction. Each row of MEMS mirrors can correspond to a particular vertical steering angle of the laser pulse scanner, which steers laser pulses vertically only across multiple vertical steering angles. The vertical steering angle represents multiple steering directions. Each row of MEMS mirrors can be turned on to allow reflected laser pulses from the multiple steering directions corresponding to the vertical steering angle to pass through the spatial filter, and to be incident on multiple columns of the two-dimensional pixel array of photodetectors. The photons that pass through the spatial filter are to be processed by the controlling unit, which is to reject noises in the photons based on one or more fixed temporal patterns specific to laser pulses emitted by the LiDAR device.

In one embodiment of the LiDAR device according to the first aspect, the spatial filter blocks photons reaching the spatial filter from any other directions except the one or more directions. The aperture is to be turned off when the laser pulse scanner starts to steer laser pulses in a different direction or in a different set of directions corresponding to a vertical steering angle. The controlling unit is programmed to synchronize operations of various units in the LiDAR device such that the aperture that has been dynamically created on the spatial filter corresponds to the current steering directions or the current vertical steering angle of the laser pulse scanner. The controlling unit is also programmed such that photons that pass through the spatial filter are to be incident on photodetectors that are not in their dead times.

In one embodiment of the LiDAR device according to the first aspect, the LiDAR device includes one or more optical elements positioned before the spatial filter; and an optical relay lens positioned after the spatial filter. The one or more optical elements are to focus the reflected photons from the one or more directions to the aperture. The optical relay element is to project the photons that pass through the spatial filter as one or more laser stripes onto the one or more sets of photodetectors of the plurality of photodetectors.

According to a second aspect of the invention, a method of noise rejection in a LiDAR device includes the operations of receiving reflected photons from one or more directions in which laser pulses are steered by a laser pulse scanner; and dynamically creating an aperture on a spatial filter positioned before a plurality of photodetectors based on the one or more directions, the aperture enabling reflected photons from the one or more directions to pass through the spatial filter. The method further includes the operation of directing the photons that pass through the spatial filter to one or more sets of photodetectors in the plurality of photodetectors.

The method of noise rejection is to be performed on a LiDAR device according to any of the previous implementation forms of the LiDAR device according to the first embodiment of the invention.

According to a third aspect of the invention, a computer program stored on a computer readable medium or an integrated circuit is disclosed. The computer program can execute the preceding methods according to the second aspect of the invention and various embodiments of the aspect when executed by a processor.

The above summary does not include an exhaustive list of all aspects of the present invention. It is contemplated that the invention includes all devices, computer media, and methods that can be practiced from all suitable combinations of the various aspects summarized above, and also those disclosed in the Detailed Description below.

BRIEF DESCRIPTION OF THE DRAWINGS

Embodiments of the disclosure are illustrated by way of example and not limitation in the figures of the accompanying drawings, in which like references indicate similar elements.

FIGS. 3A and 3B illustrate an example embodiment of the LiDAR device as shown in FIG. 2.

FIGS. 7A-7B illustrate another example implementation of a spatial filter in accordance with an embodiment.

DETAILED DESCRIPTION

Figure 1:
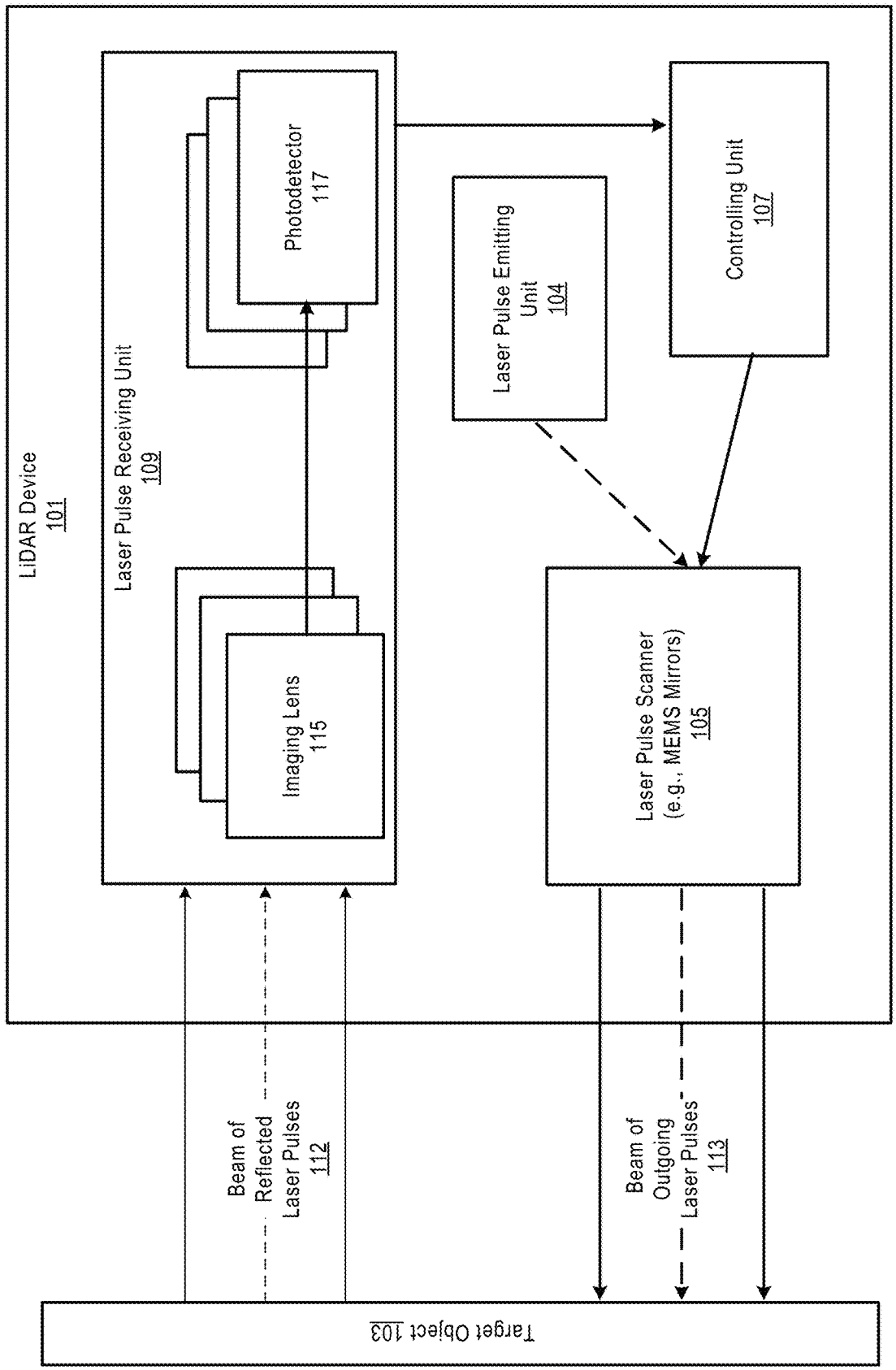
FIG. 1 illustrates an example LiDAR device in which embodiments of the invention can be implemented in accordance with an embodiment.

Various embodiments of the invention are described below. In the disclosure, reference to "one embodiment" or "an embodiment" means that a particular feature, structure, or characteristic described in conjunction with the embodiment can be included in at least one embodiment. The appearances of the phrase "in one embodiment" or "in an embodiment" in various places in the disclosure do not necessarily all refer to the same embodiment.

The following description and drawings are illustrative and are not to be construed as limiting. Numerous specific details are described to provide a thorough understanding of various embodiments. However, in certain instances, well-known or conventional details are not described in order to provide a concise discussion of the embodiments.

According to various embodiments, devices, methods, and computer media for noise rejection are described. The various embodiments can use a dynamically created aperture on a spatial filter to reject noises from directions where desired signals are known to be absent. When a LiDAR device is to steer laser pulses in one or more directions, the LiDAR device expects to receive reflected photons from the one or more directions. All the other directions are directions from which noises rather than desired signals are to be expected. The aperture is dynamically created on the spatial filter at a position in synchronization with the one or more directions in which emitted laser pulses from the LiDAR device are steered. Reflected photons (i.e., desired signals) from the one or more directions can pass through the spatial filter via the aperture, and can be projected on one or more sets of photodetectors. Photons from all other directions except the one or more directions are noises and therefore can be blocked by the spatial filter. Noises in the photons that pass through the spatial filter are to be rejected based on one or more fixed temporal patterns identified in laser pulses emitted by the LiDAR device. The spatial filter can be implemented using various technologies, including an electrochromic display, an array of micromechanical (MEMS) mirrors, a liquid crystal display (LCD), and an electrowetting display.

The above-described features for noise rejection can improve the signal-to-noise ratio of a LiDAR device, thereby increasing the detection range, detection sensitivity, and/or detection precision of the LiDAR device.

These features can also reduce the cost of a solid state LiDAR device. A solid state LiDAR device typically has a large array of high-sensitivity, high-performance photodetectors, which requires the use of large MEMS mirrors as a detector scanner. Large MEMS mirrors are costly and technically difficult to make. The dynamical spatial filter would remove the need to use large MEMS mirrors as a detector scanner in a solid state LIDAR device. Without using large MEMS mirrors as a detector scanner, solid state LiDAR devices described herein would cost less. Further, large MEMS mirrors tend to have small rotation angles and a low resonant frequency (e.g., in the low hundreds of Hz or even in the tens of Hz). The low resonant frequency tends to increase the probability that vibration (e.g., vibration in normal vehicle operations) would affect its performance and accuracy. Solid state LiDAR devices without large MEMS mirrors as a detector scanner therefore tend to have better performance and accuracy, particularly when the solid state LiDAR devices are used in an environment with vibrations, for example, when mounted on an autonomous driving vehicle.

In one embodiment, the dynamically created aperture on the spatial filter can correspond to a vertical steering angle or a steering direction of the laser pulse scanner depending on whether the laser scanner steers the emitted laser pulses vertically only, or both vertically and horizontally. When the emitted laser pulses are steered vertically only, the aperture can be dynamically created in synchronization with a vertical steering angle, and can include a row of segmented areas on the spatial filter, with the row of segmented areas corresponding to the vertical steering angle. When the laser scanner steers laser pulses at the vertical steering angle, the controlling unit of the LiDAR device can operate to turn on the corresponding row of segmented areas on the spatial filter; when the laser scanner steers laser pulses at a different vertical steering angle, the controlling unit can operate to turn off the row of segmented areas.

When the emitted laser pulses are steered both vertically and horizontally, the aperture can be dynamically created in synchronization with a steering direction, with the aperture being part of a row on the spatial filter. The row can correspond to a vertical steering angle. The part of the row can be a single or multiple segmented areas within the row. A steering direction can represent a combination of the vertical steering angle and a horizontal steering angle. Therefore, a vertical steering angle can correspond to multiple steering directions. When the laser scanner steers laser pulses at the steering direction, the controlling unit of the LiDAR device can operate to turn on the one or multiple segmented areas on the spatial filter; when the laser scanner steers laser pulses at a different steering direction, the controlling unit can operate to turn off the one or multiple segmented areas.

In one embodiment, the spatial filter blocks photons reaching the spatial filter from any other directions except the one or more steering directions. The spatial filter can be implemented using an electrochromic display, an array of micromechanical (MEMS) mirrors, a liquid crystal display (LCD), or an electro-wetting display.

In one embodiment, the photons that pass through the spatial filter include noises as well as reflected photons from the laser pulses emitted by the LiDAR device. A controlling unit can reject the noises in the photons that pass through the spatial filter based on one or more fixed temporal patterns in the laser pulses emitted by the LiDAR device.

In one embodiment, the spatial filter can be implemented using a customized LCD that includes a single segmented area in each row. The segmented area in the row can represent a pixel of a LiDAR image. Laser pulses steered at a vertical steering angle can pass through the segmented area and can be projected on a single column of a 2-D SPAD pixel array.

The LiDAR devices described herein can include a computer program with executable computer program instructions stored on a non-transitory machine readable medium. The computer program instructions can cause one or more microprocessors to perform the one or more methods described or claimed herein when the computer program instructions are executed by the one or more microprocessors. The computer program instructions can be stored in non-volatile memory such as flash memory, embedded memory in an integrated circuit or other forms of memory.

The processes depicted in the figures that follow are performed by processing logic that comprises hardware (e.g. circuitry, dedicated logic, etc.), software, or a combination of both. Although the processes are described below in terms of some sequential operations, some of the operations described may be performed in a different order. Moreover, some operations may be performed in parallel rather than sequentially.

Solid State LiDAR Device

FIG. 1 illustrates an example LiDAR device in which embodiments of the invention can be implemented in accordance with an embodiment.

The example LiDAR device can be a solid state LiDAR device 101, which can measure distances to objects in an environment by illuminating the objects with laser pulses. Differences in return times of the reflected laser pulses and wavelengths can be used to create a point cloud of the environment. The point cloud can provide spatial location and depth information, for use in identifying and tracking the objects.

As shown in FIG. 1, the LiDAR device 101 can include a laser pulse emitting unit 104, a laser pulse scanner 105, a laser pulse receiving unit 109, and a controlling unit 107. The laser pulse emitting unit 104 can include one or more laser emitters that emit beams of short pulses of laser light including photons of various frequencies.

For example, in FIG. 1, the laser pulse emitting unit 104 emits a beam of outgoing laser pulses 113. The beam of outgoing laser pulses 113 can be steered or scanned by the laser pulse scanner 105 in one or more directions using a variety of mechanisms, including microelectromechanical system (MEMS) mirrors, and one or more optical phased arrays (OPA). Each of the one or more directions can be referred to as a steering direction or a scanning direction. A vertical angle and a horizontal angle associated with each steering direction can be referred to as a steering angle or a scanning angle respectively. The laser pulse scanner 105 can steer one or more beams of laser pulses in a steering direction. Each beam of laser pulses can have a fixed number of pulses.

The controlling unit 107 can include control logic implemented in hardware, software, firmware, or a combination thereof. The controlling logic 107 can drive the other units or subsystems 104, 105, and 109 of the LiDAR device 101 in a coordinated manner, and can execute one or more data processing algorithms to perform one or more operations for signal filtering and object detection. For example, the controlling unit 107 can synchronize the laser pulse emitting unit 104 and the laser pulse scanner 105 so that the laser pulse scanner 105 can scan a horizontal field of view in multiple lines.

The laser light receiving unit 109 can collect one or more beams of laser pulses (e.g., beam of laser pulses 112) reflected from a target object 103 using one or more imaging lens (e.g., imaging lens 115), and focus the beams of laser pulses on one or more photodetectors (e.g., photodetector 117). Each photodetector can be a high-sensitivity photodiode, for example, a linear mode avalanche-photodiode (APD) or a single-photon avalanche diode (SPAD). The one or more photodetectors can convert photons in the reflected beam of laser pulses into electricity. The laser pulse receiving unit 109 can send returned signals incident on each photodetector to the controlling unit 107 for processing.

In one example implementation, the LiDAR device 101 can have all its subsystems integrated on a single chip. A beam of laser pulses from the laser emitting unit 104 can include a fixed number of laser pulses, and can be coupled to a number of waveguides through a beam splitter. Each waveguide can be a structure on the single chip to guide one or more beams of laser pulses to one of a number of MEMS mirror arrays in the laser pulse scanner 105 through an array of beam deflectors. One or more avalanche photodiode (APD) arrays in the laser pulse receiving unit 109 can collect the reflected pulses, from which distances between the laser pulse emitting unit 104 and the target object 103 can be calculated. On the single chip, each die, each MEMS mirror array, one or more photonic integrated circuits in the controlling unit 107, and the APD arrays can be attached to one another through, for example, wafer bonding and/or solder bonding.

In the example implementation, each beam deflector can be a structure that deflects a beam of laser pulses out-of-plane at a fixed angle. Examples of the beam deflector include a grating, a mirror, a prism, or any combination thereof. A controller can control one or more two-dimensional actuators of the MEMS mirror arrays to drive the X axis and Y axis of each MEMS mirror in the MEMS mirror arrays using separate channels of a field-programmable gate array (FPGA) system (e.g., a 12-bit FPGA system). The controller can provide rotations up to a predetermined degree (e.g., up to ±20°) about each axis. The controller can also steer each mirror in the MEMS mirror arrays in a zigzag or spiral pattern. With the controller operating as such, a pair of deflector and MEMS mirror can cover azimuthal (i.e. horizontal) and altitudinal (i.e. vertical) optical angles of a variety of sizes. The angles of the MEMS mirrors and timings of the corresponding beams of laser pulses can be used by the controlling unit 107 to track azimuthal and altitudinal angles of out-going beams of laser pulses.

In one embodiment, laser diodes in the laser pulse emitting unit 104 can operate in a pulsed mode with a pulse repeating at a fixed interval (e.g., every few micro-seconds). The laser diodes and laser drive circuits for providing appropriate bias and modulation currents for the laser diodes can be chosen according to predetermined performance parameters of the LiDAR device 101. Examples of the performance parameters can include a required maximum range of scanned space and resolution.

In one embodiment, multiple laser pulse emitting units such as the laser pulse emitting unit 104 can be used in the example implementation. Each laser pulse emitting unit can be coupled to different deflectors. A defector and a MEMS mirror can form a pair to cover a specific angle. Multiple pairs of the defectors and the MEMS mirrors can cover a desirable range of angles.

In one embodiment, the components described in the example implementation can be positioned within a small range of distances (e.g., ±10 um) on the single chip. Placing the components within such a small range would make optical alignment and angle calibration easier, thereby facilitating high-volume manufacturing of the LiDAR device 101.

Further, in one embodiment, multiple LiDAR devices such as the LiDAR device 101 can be arranged in a circular manner to provide a steering angle (i.e., scanning angle) of 360 degrees.

Dynamic Spatial Filter

In the example LiDAR device illustrated in FIG. 1, various types of noises (e.g., ambient light and electronic noises) can negatively impact the SNR of the LiDAR device 101. When the laser pulse receiving unit 109 receives scattered ambient light, the photodetectors (e.g., photodetector 117) can be saturated, particularly when the ambient light is sunlight, which tends to have an enormous power on a broad range of wavelengths. The sunlight-induced noises can be orders of magnitude higher than weak LiDAR signals represented by reflected laser pulses from bright surfaces such as landmass, snow and thick clouds.

To increase the detection range of a LiDAR device, techniques for robust rejection of ambient light and high-speed acquisition of returned signals can be used. However, due to the lack of a mechanical rotating scanner and a mechanical detector scanner in a solid state LiDAR device, some ambient light filtering techniques that are effective in an electromechanical LiDAR device may not be feasible in a solid state LiDAR device.

For example, in an electromechanical LiDAR device, one ambient light filtering technique is to use a single avalanche photodiode (APD) or a small number of APDs as a photodetector, which can effectively function as a natural spatial filter due to its small dimensions because any photons not incident on the photodetector are automatically filtered out. The natural spatial filter would work in an electromechanical LiDAR device due to the presence of a mechanical rotating scanner and a mechanical detector scanner in the electromechanical LiDAR device. The mechanical rotating scanner and a mechanical detector scanner would accurately direct desired signals reflected from a large reflection surface to the photodetector, whose photon multiplication gain can further improve signal-noise ratios (SNR) of the electromechanical LiDAR device, thereby increasing its detection ranges.

In a solid state LiDAR device such as the LiDAR device 101, however, it would be difficult to use a single APD or a small number of APDs as a natural spatial filter because a solid state LiDAR device does not have a mechanical rotating scanner or a mechanical detector scanner. Such a solid state LiDAR device therefore would miss signals reflected from a target object with a large reflection surface. Although an APD pixel array (e.g., a 2-D focal plane array) could be used to compensate for the lack of a mechanical laser scanner and a mechanical detector scanner to enable a solid state LiDAR device to receive more reflected signals from a large reflection surface, such a pixel array would lose its natural spatial filtering capability due to its large size. Further, some APD pixel arrays (e.g., a linear mode APD pixel array) would be technically difficult and prohibitively expensive to make.

Therefore, to increase the detection ranges of a solid state LiDAR device such as the LiDAR device 101, a 2-D pixel array of Geiger-mode single-photon avalanche diodes (SPADs) would be used as photodetectors, coupled with a separate dynamic spatial filter positioned before the 2-D pixel array. The 2-D pixel array of SPADs can include multiple columns of SPADs, with each column of SPADs connected in parallel in the vertical direction. A simple 2-D SPAD array with a single column of SPADs would be undesirable, because a solid state LiDAR device with such a simple SPAD array as photodetectors would require each vertical steering angle of the laser pulse scanner to correspond to a single SPAD on the simple SPAD array. Such a configuration therefore would have a number of drawbacks. For example, in such a configuration, each SPAD as a photodetector would need a time-to-digital converter (TDC), which reduces the fill factor of the active area on the photodetectors. Further, in such a configuration, each SPAD photodetector, which has a non-negligible dead time, may miss reflected photons due to dark events and/or ambient light.

In a 2-D pixel array as disclosed herein, however, one TDC can be used for a column of SPADs, thereby increasing the fill factor of the active area. Further, using a column of SPADs instead of one SPAD as a photodetector for a vertical steering angle can avoid missing reflected photons due to the dead time associated with each SPAD photodetector.

In one embodiment, the spatial filter can be dynamically turned on and turned off based on the current steering directions or steering angles of the LiDAR device, and therefore can effectively block ambient lights and other noises from directions other than the current steering directions. Signals that do pass through the spatial filter are directed to one or more columns of the 2-D pixel array. The combination of the large-dimension 2-D pixel array and the dynamically configured spatial filter can compensate for the lack of mechanical laser scanners and mechanical detector scanners in a solid state LiDAR device. Such a combination can increase the device's SNR without requiring a substantial increase in manufacturing cost.

As used herein, a steering direction refers to a combination of a vertical steering angle and a horizontal steering angle from which reflected pulses are entering the laser receiving unit of a LiDAR system, or in which emitted laser pulses are steered. For example, the combination of a vertical angle of 5 degree and a horizontal angle of 0 degree is considered as one direction, while the combination of the vertical angle of 5 degree and a horizontal degree of 5 degree is considered as another direction. In this disclosure, a scanning angle and a steering angle are used interchangeably, and scanning laser pulses and steering laser pulses are also used interchangeably.

The various aspects, implementations, and embodiments described in this disclosure can also overcome the dead time issue associated with SPADs. By directing beams of incoming laser pulses from different directions to different columns of the 2-D pixel array, a column of SPADs in the pixel array can have sufficient time to recover to its original state after registering a photon, and to become ready to register another photon from a different direction.

Figure 2:
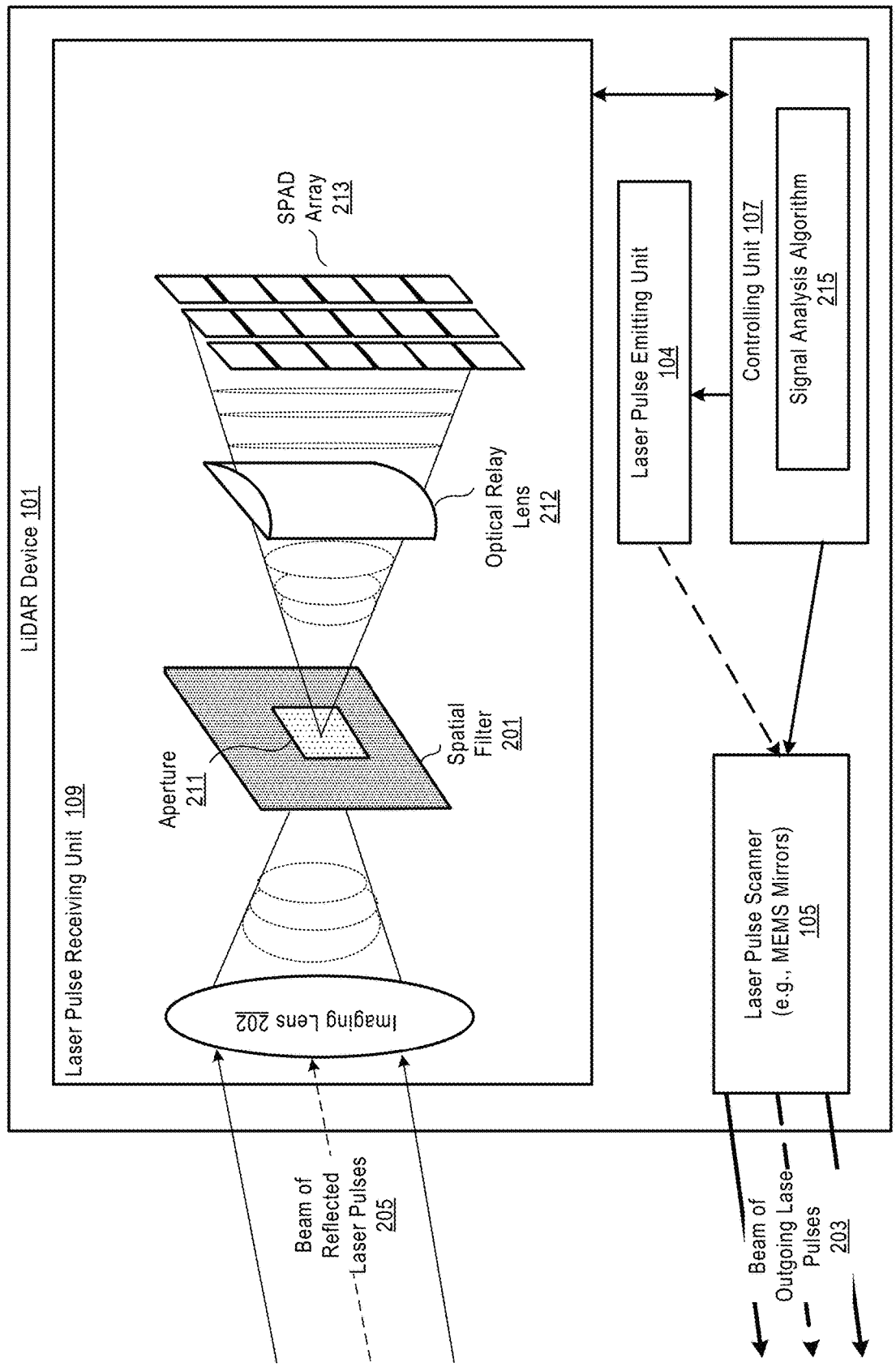
FIG. 2 illustrates an example LiDAR device with a dynamical spatial filter in accordance with an embodiment.

FIG. 2 illustrates an example LiDAR device with a dynamical spatial filter in accordance with an embodiment.

As shown in FIG. 2, the laser pulse receiving unit 109 can include one or more imaging lens (e.g., imaging lens 202), a spatial filter 201, an optical relay lens (e.g., a cylindrical lens) 212, and a 2-D SPAD array 213. The spatial filter 201 can be placed at the image plane of the imaging lens 202, and can be implemented using an electrochromic display, an array of micromechanical mirrors, a liquid crystal display (LCD) in combination with a polarizer, and an electrowetting display. The spatial filter 201 can include an array of segmented areas, with each segmented area representing an optical transmission area capable of being turned on and turned off.

In one embodiment, when the spatial filter is implemented using a LCD, turning a segmented area on would change the segmented area from a low optical transmission area to a high optical transmission area. Conversely, turning-off a segmented area would change the segmented area from a high optical transmission area to a low optical transmission area. A high optical transmission area would allow signals and noises from one or more known directions to pass through the spatial filter 201, whereas a low optical transmission area would substantially block signals and noises reaching the area.

In one embodiment, the spatial filter 201 can be configured to block only signals and noises with certain wavelengths (e.g., wavelengths in a predetermined range) at a low optical transmission area, or allow signals and noises with certain wavelengths to pass through a high optical transmission area.

Each segmented area can correspond to a particular direction from which signals and noises enter the laser pulse receiving unit 109, and can correspond to a pixel of an image to be formed from a target object. Alternatively, multiple segmented areas can correspond to a pixel of the image.

One or more segment areas on the spatial filter 201 can be dynamically turned on to create an aperture based on the manner the laser pulse scanner 105 is steering laser pulses.

For example, when the laser pulse scanner 105 steers laser pulses both horizontally and vertically, a single segmented area can be turned on in response to the laser pulse scanner 105 steering a beam of outgoing laser pulses in a direction corresponding to the single segmented area. When a beam of outgoing laser pulses (e.g., the beam of outgoing laser pulses 203) is steered in a direction of vertical N degree and horizontal M degree, a corresponding beam of reflected laser pulses (e.g., the beam of reflected laser pulses 205) can enter the laser pulse receiving unit 109 from that direction. The controlling unit 107 can operate to turn on a corresponding segmented area on the spatial filter 201 so that that segmented area would function as an aperture 211. The controlling unit 107 can coordinate the position of the aperture 211 and the steering directions of the laser pulse scanner 105 so that the imaging lens 202 can focus the beam of reflected laser pulses 205 to the aperture 211. After passing through the aperture 211, the beam of reflected laser pulses 205 can be projected by the optical relay lens 212 as a laser stripe onto a column of the 2-D SPAD array 213. The column of the 2-D SPAD array 213 can be preconfigured to receive reflected signals from a particular horizontal angle. Noises such as ambient light from all other directions other than the direction corresponding to the aperture would be blocked.

As another example, when the laser pulse scanner 105 steers beams of laser pulses vertically only, multiple segmented areas can be turned on as a single unit to constitute the aperture 211. As such, the aperture 211 would correspond to a vertical angle (e.g., vertical N degree). The number of segmented areas to be turned on as the aperture 211 can be determined based on a predetermined resolution of the LiDAR device. The more segmented areas to be turned on for each vertical steering angle, the higher the resolution of the LiDAR device. Each of the number of turned-on segmented areas further corresponds to a horizontal angle (e.g., horizontal M degree) at that vertical angle.

In this example, the beam of outgoing laser pulses 203 represents all the outgoing laser pulses emitted at that vertical steering angle. In one implementation, the outgoing laser beam 203 can be expanded horizontally by a diffractive optical element (e.g., a diffractive diffuser) or a cylindrical lens. Accordingly, the beam of reflected laser pulses 205 reflected from the horizontally expanded laser beam 203 can represent all reflected laser pulses from that vertical steering angle. A portion of the reflected laser pulses 205 can pass through one of the turned-on segmented areas in the aperture 211. The portion of the beam of reflected laser pulses 205 corresponds to a horizontal steering angle at the vertical steering angle, and can be projected as a laser stripe on a column in the 2-D SPAD array 213, as configured or programmed by the controlling unit 107. Therefore, the beam of reflected laser pulses 205 at that vertical angle would be projected by the optical relay lens 212 as multiple laser stripes on multiple columns in the 2-D SPAD array 213.

The spatial filter 210 can dynamically change the location of the aperture 211 based on the vertical steering angle of an outgoing laser beam or based on a combination of the vertical steering angle and a horizontal steering angle of the laser beam. The capability of the spatial filter 201 in rejecting noises can be determined by an extinction ratio, defined as a ratio between a number of segmented areas in the aperture 211 and a total number of segmented areas in the whole spatial filter 201.

In one embodiment, the time it takes for a segmented area to be turned on or turned off or vice versa can determine the refresh rate of the LiDAR device 101. For example, the LiDAR device 101 can turn on or turn off a segmented area with a time period ranging from sub-milliseconds to a few milliseconds.

In one embodiment, the 2-D SPAD array 213 can include SPADs that are connected in parallel in the vertical direction but individually addressable in the horizontal direction. The 2-D SPAD array 213 can provide a column of SPADs operating in the Geiger mode for each horizontal steering angle at a given vertical steering angle, to reduce detection dead time.

In one embodiment, the controlling unit 107 can be programmed to schedule vertical scans in such a manner that laser pulse scanner 105 does not scan laser pulses in a next vertical steering angle before the controlling unit 107 completes reading out output signals from a current vertical scan and before a predetermined number of SPADS (e.g., all SPADs) in the 2-D SPAD array 213 passes their dead time.

In one embodiment, the controlling unit 107 can perform one or more data processing algorithms to process data output from the 2-D SPAD array 213. The output intensity of the 2-D SPAD array 213 is proportional to the number of photons returned to the imaging lens 202. The controlling unit 107 can show multiple photons returned within a particular time frame (e.g., 2-4 ns) as a higher amplitude electrical pulse for an analog detection system, or as a higher count in a system with an integrated time-to-digital converter (TDC), thereby distinguishing one or more events from detector noise of the 2-D SPAD array 213 and from ambient light, since the detector noise and the ambient light tend to be relatively uniform in terms of the number of photons within a certain frame.

The dynamic spatial filter 201 described above can work in conjunction with the controlling unit 107 and one or more other subsystems in the LiDAR device 101 to reduce noises reaching the photodetectors by rejecting noises from directions other than the one or more directions corresponding to the aperture 211 in the spatial filter 201. Since ambient light and shot noise are positively related, reducing ambient light can also reduce shot noise. The reduction of noises coupled with the relatively unchanged reflected laser signals would increase the SNR of the LiDAR device 101.

To further increase the SNR of the LIDAR device 101, the controlling unit 107 can be programmed to reject noises that the spatial filter 201 is not able to block. Such noises can include ambient light and any other types of noises passing through the aperture 201; and residue ambient light reaching the 2-D SPAD array 213 through the turned-off segmented areas of the spatial filter 201, as a turned-off segmented area may not block 100% of light of all wavelengths.

In one embodiment, the controlling unit 107 can perform a signal analysis on the output data from the 2-D SPAD array 213 using a predetermined signal analysis algorithm 215. The signal analysis algorithm 215 can detect a fixed temporal pattern of laser pulses for each range of detection, and use the fixed temporal pattern to identify reflected laser pulse signals from the data output of the 2-D SPAD array 213.

As an illustrative example, the laser pulse emitting unit 104 emits a fixed number of laser pulses for each detection range; and for the given laser pulse emitting unit 104, temporal intervals between the laser pulses in a laser beam tend to be relatively fixed. These temporal intervals can form a temporal pattern that does not change from one range detection to another. The controlling unit 107 can use the temporal pattern to identify reflected laser pulse signals. Photons that do not match the temporal pattern are more likely to be noises and can be discarded.

FIGS. 3A and 3B illustrate an example embodiment of the LiDAR device 101 as shown in FIG. 2.

As shown in FIGS. 3A and 3B, the laser pulse scanner 105 of the LiDAR device 101 as shown in FIG. 2 is steering laser pulses both vertically and horizontally. Accordingly, a single segmented area in row X 309 on a spatial filter 301 is turned on to operate as aperture A 307 in response to the laser pulse scanner 105 steering outgoing laser pulses in the direction of a vertical angle of X degree and a horizontal angle of A degree. The aperture A 307 would allow a beam of reflected pulses 305 from the direction to pass through the spatial filter 301, as shown in FIG. 3A.

In FIG. 3B, the laser pulse scanner 105 steers laser pulses at a different horizontal angle (e.g., a horizontal angle of B degree) for the vertical angle of X degree. In response, a different segmented area is turned on to operate as aperture B 321 to allow a beam of reflected pulses 306 from the direction of the vertical angle of X degree and the horizontal angle of B degree to pass through the spatial filter 301. While the laser pulse scanner 105 is scanning at this particular direction, the aperture A 307 corresponding to the previous scan direction can be turned off. Therefore, in this particular embodiment, only one segmented area in the spatial filter 301 can be in an ON state to function as the aperture at any particular time.

Similarly, a segmented area 322 immediately next to aperture B 321 can be turned on to operate as the next aperture to allow reflected laser pulses from a next steering direction to pass through the spatial filter 301. The above process can be repeated until the laser pulse scanner 105 completes scanning at the vertical angle of X degree. The number of segmented areas in each row of the spatial filter 301 can be determined based on a predetermined resolution of an image of a target object. Each segmented area can correspond to one pixel in the image of the target object.

Reflected laser pulses passing through each aperture can be projected by the optical relay lens 212 on different columns 317 and 323 as different laser stripes 315 and 325 on the 2-D SPAD array 213.

The controlling unit 107 can be programmed to read out data from a column on the 2-D SPAD array 213 corresponding to a previous steering direction as soon as the laser pulse scanner 105 starts to scan laser pulses in a next steering direction. Alternatively, the controlling unit 107 can be programmed to read out data from the whole 2-D SPAD array 213 after the laser pulse scanner 105 has completed steering laser pulses at the vertical angle X.

The laser pulse scanner 105 can scan laser pulses at different vertical angles corresponding to row Y 310 and row Z 311 in the same manner that the laser pulse scanner 105 has scanned laser pulses at the vertical angle X.

The controlling unit 107 can be programmed to synchronize the position of each aperture on the spatial filter 301 with each scan direction, and project laser pulses passing through each aperture as different laser stripes on different columns on the 2-D SPAD array 213.

Figure 4:
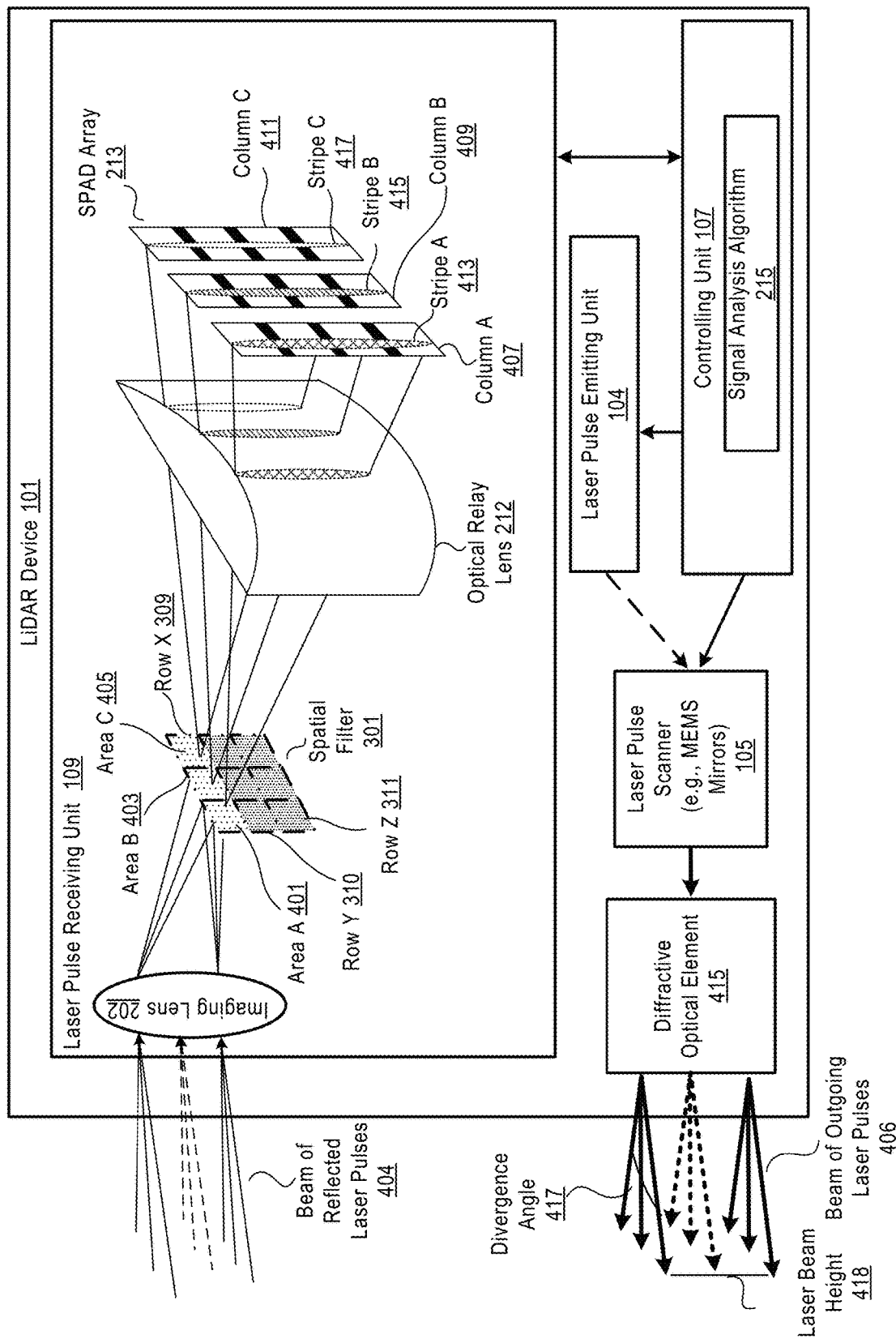
FIG. 4 illustrates another example embodiment of the LiDAR device shown in FIG. 2.

FIG. 4 illustrates another example embodiment of the LiDAR device 101 shown in FIG. 2.

As shown in FIG. 4, outgoing beams of laser pulses are steered vertically only, with each outgoing beam of laser pulses (e.g., outgoing laser beam 406 with a beam height 418) at a particular vertical steering angle (e.g., vertical angle X) being horizontally expanded in an angular manner by a diffractive optical element 415 or a cylindrical lens. A divergence angle 417 of the horizontally expanded laser beam can be determined by a predetermined field of view (FOV) and a predetermined detection range.

For each vertical steering angle, a row of segmented areas (e.g., row X 309) on the spatial filter 301 can be turned on to operate as an aperture for that vertical steering angle. A beam of reflected laser pulses 404 reaching the spatial filter 301 from that vertical steering angle can pass through each of the segmented areas 401, 403 and 405 in the row. The optical relay lens (e.g., a cylindrical lens) 212 can project the laser pulses that have passed through the spatial filter 301 onto different columns 407, 409 and 411 of the 2-D SPAD array 213 as different laser stripes 413, 415, and 417. A complete 3D point cloud of a target object can be produced with a single scan along a vertical axis in the LiDAR device 101.

In one embodiment, a segmented area on the spatial filter 301 can correspond to a pixel of a LiDAR image of a target object and to a steering direction. The LiDAR device 101 can steer laser pulses in a range of steering directions (horizontal angles at a particular vertical angle) in parallel, thus increasing the system's data throughput and reducing the refresh rate of the LiDAR device. In comparison, the LiDAR device described in FIGS. 3A-3B could be limited by the speed of the laser pulse scanner, and/or the speed at which segmented areas on the spatial filter can be turned on and turned off. The LiDAR device in FIGS. 3A-3B also may have a higher refresh rate.

In one embodiment, the LiDAR device 101 can have a bi-axial LiDAR configuration, and can have the laser pulse scanner 105 and a detection system placed in a same orientation as the beam expansion direction to reduce blind spots.

Figure 5:
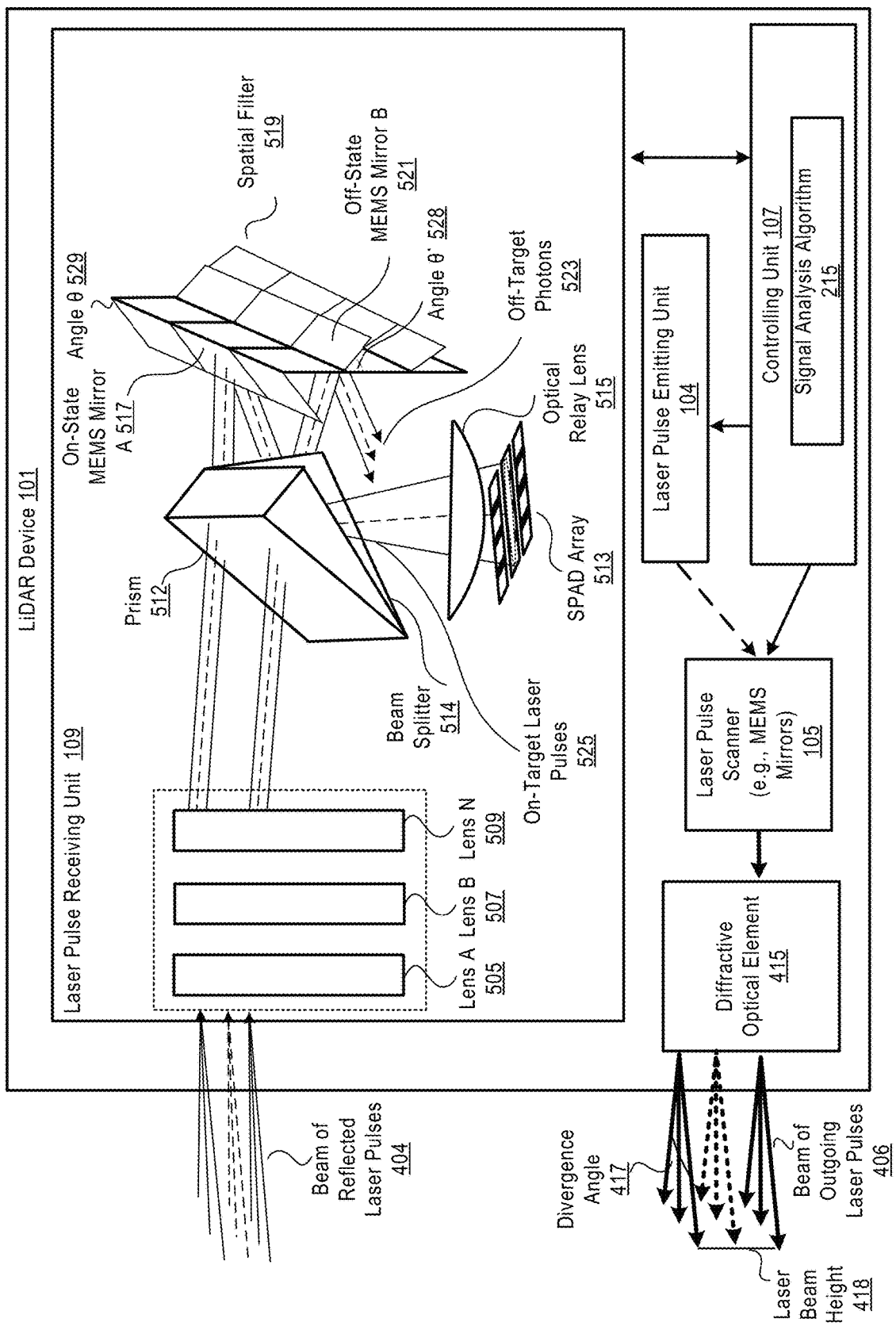
FIG. 5 illustrates an example implementation of a spatial filter in accordance with an embodiment.

FIG. 5 illustrates an example implementation of a spatial filter in accordance with an embodiment. The spatial filter implemented here can be the spatial filter illustrated in FIG. 2, FIGS. 3A and 3B, and FIG. 4.

In this implementation, a spatial filter 519 is based on a number of MEMS mirrors or other types of digital mirrors. The MEMS mirrors can be arranged into a two-dimensional pixel array on a same plane. In one embodiment, each MEMS mirror can be hinged to a frame structure such that the MEMS mirror can be turned within a predefined angle.

Each MEMS mirror is functionally similar to a segmented area in the spatial filter 301 in FIG. 3A, FIG. 3B and FIG. 4. For example, each MEMS mirror can correspond to a pixel and to a steering direction; each row of MEMS mirrors can correspond to a particular vertical steering angle of the LiDAR device 101; and each MEMS mirror can be turned on and turned off.

In one embodiment, a natural state of an MEMS mirror is in the same orientation of the plane. An MEMS mirror in its natural state is in an OFF state. An OFF-state MEMS mirror can be turned on by being tilted to a predefined angle from the plane to a particular direction. The angle and direction are configurable and are based on the positions and orientations of other subsystems in the LiDAR device 101. An MEMS mirror can be turned off by being tilted back to its original orientation.

In one embodiment, an MEMS mirror can be turned off by being tilted to a first predetermined angle from the plane to one direction, and turned off by being tilted to a second predetermined angle from the plane to an opposite direction.

In the implementation shown in FIG. 5, MEMS mirror A 517 has been turned on by being tilted to an angle $\theta$ 529 from the plane of the spatial filter 519, and MEMS mirror B 521 has been turned off by being tilted to an angle $\theta'$ 528.

An MEMS mirror in its ON state can operate in conjunction with a prism 512 to direct at least a portion of the beam of reflected laser pulses 404 from a particular direction to a particular column of a 2-D SPAD array 513. As shown in FIG. 5, a portion of the beam of reflected laser pulses 404 is directed as on-target laser pulses 525 to the SPAD array 513. The on-target laser pulses 525 can be projected as a laser stripe by an optical relay lens 515 before reaching the SPAD array 513.

An MEMS mirror in its OFF state can deflect photons incident on that MEMS mirror away from the SPAD array 513 as off-target photons, which can include ambient light and various other noises. For example, MEMS mirror B 521 that is in its OFF state can deflect ambient light incident on the mirror away from the SPAD array 513 as off-target photons 523.

As shown in FIG. 5, a whole row of MEMS mirrors of the spatial filter 519 are turned on to allow laser pulses from a particular vertical steering angle to be redirected to multiple columns in the SPAD array 513, with laser pulses from each steering horizontal angle at the vertical steering angle to be directed to one column of the SPAD array 513.

In this implementation, MEMS mirror A 517 and MEMS mirror B 521 are described as examples to illustrate how a MEMS mirror can be turned on or turned off. It would be appreciated that other MEMS mirrors in the spatial filter 519 can be similarly turned on and turned off.

As further shown in FIG. 5, a number of receiver lenses 505, 507 and 509 are positioned before the prism 512 to collect return photons. At least one of the receiver lenses is a 50 mm focal length, f/0.9 imaging lens. The number of photons to be collected by the imaging lens can be determined by the size of its effective lens aperture. At least a first portion (e.g., 50%) of the collected photons can be incident on the spatial filter 519 through the prism 512, and at least a second portion (e.g., 25%) of the first portion of the collected photons can be redirected by the beam splitter 514 to the SPAD array 513.

The prism 512 can be a wedge prism placed in front of the beam splitter 514, and can tilt its image plane to the same orientation with the on-state MEMS mirrors in the spatial filter 519.

In the example implementation, all components including the prism 512, the imaging lenses 505-509, the spatial filter 519, and the SPAD array 515 can be positioned within a predetermined distance (e.g., ±100 um) so that optical alignment and angle calibration can be obtained readily, which facilitates high-volume manufacturing.

Figure 6A:
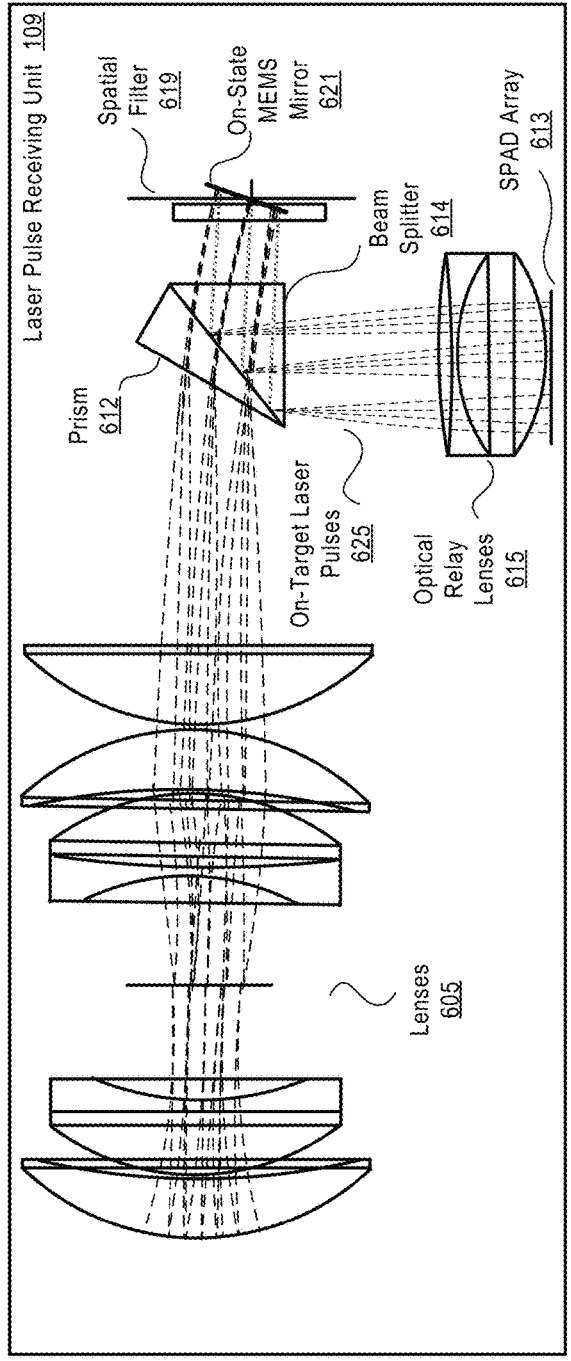
FIGS. 6A and 6B illustrate a 2-D view of the example implementation shown in FIG. 5.
Figure 6B:
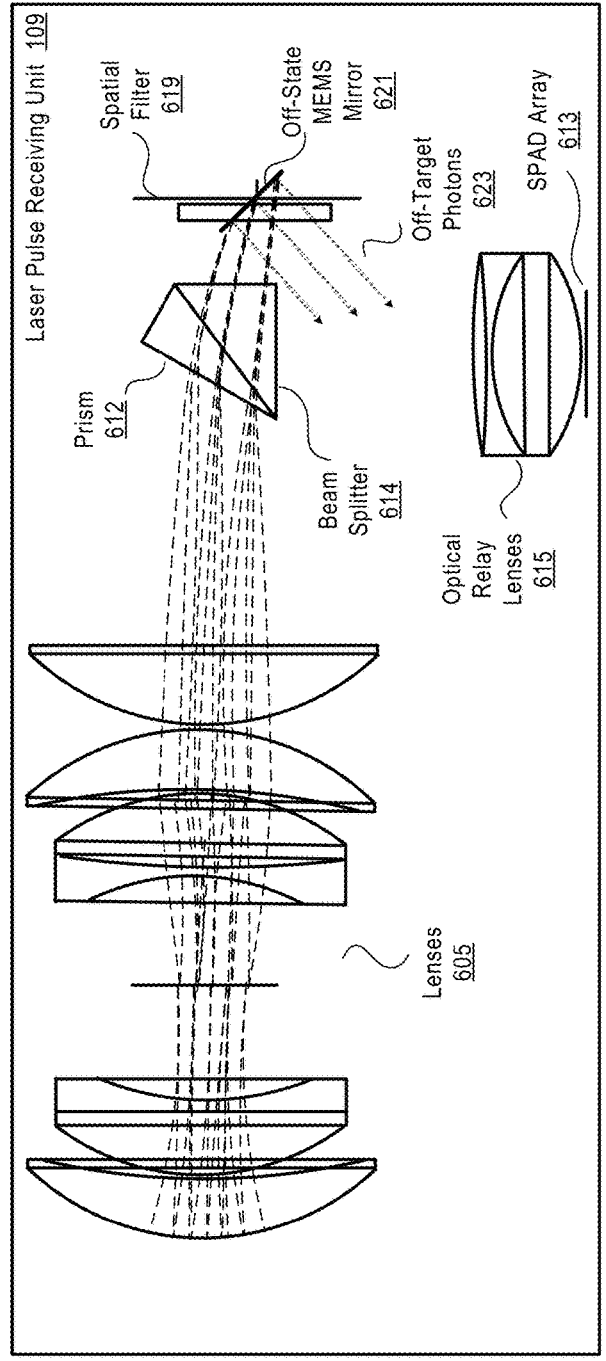

FIGS. 6A and 6B illustrate a 2-D view of the example implementation shown in FIG. 5.

In this view, lenses 605 are the lenses 505, 507 and 509 in FIG. 5; prism 612 is the prism 512 in FIG. 5; optical relay lenses 615 are the optical relay lenses 515 in FIG. 5; spatial filter 619 is the spatial filter 519 in FIG. 5; and beam splitter 614 and SPAD array 613 are respectively the beam splitter 514 and the SPAD array 513 in FIG. 5.

In FIG. 6A, an illustrative MEMS mirror 621 on the spatial filter 619 is shown to have been turned on by being tilted to a particular angle. The MEMS mirror 621 deflects at least a portion of laser pulses reflected from a particular direction as on-target laser pulses 625 to a column on the SPAD array 613.

FIG. 6B shows that the MEMS mirror 621 is in an off-state. The MEMS mirror 621 can be turned off by being tilted to another angle in a different direction. In one embodiment, the MEMS mirror 621 in the OFF state shown in FIG. 6B can be in its initial and natural position. The MEMS mirror 621 can deflect photons reaching the mirror away from the SPAD array 613 as off-target photons 623.

FIGS. 7A-7B illustrate another example implementation of a spatial filter in accordance with an embodiment. The spatial filter implemented here can be the spatial filter illustrated in FIG. 2, FIGS. 3A and 3B, and FIG. 4.

Referring to FIG. 7A, a LCD-based spatial filter 700 includes an aperture layer between two transparent electrode layers 703 and 707. The aperture layer can be a liquid crystal layer 705. A first linear polarizer layer 701 and a second linear polarizer layer 709 are respectively placed on the top of the first transparent electrode layer 703 and below the second transparent electrode layer 707. In one embodiment, ferroelectric liquid crystal can be used for the liquid crystal layer 705 due to the fast switching nature of ferroelectric liquid crystal and its natural binary state. In another embodiment, a different type of liquid crystal can be used. Unlike ferroelectric liquid crystals, other types of liquid crystals change the polarization of incoming beams of laser pulses to a degree that is largely proportional to a voltage applied.

The first transparent electrode layer 703 can be created by attaching multiple transparent horizontal electrode bars to a common physical structure. These horizontal electrode bars can be positioned parallel to each other. In one embodiment, the electrode bars can be parallel to the surface of an integrated circuit on which the laser pulse receiving unit 109 is implemented. The layer of transparent electrode bars 703 can face the imaging lens 202 as shown in FIG. 2, FIG. 3A, FIG. 3B and FIG. 4. Horizontal electrode bar 713 is an example of the multiple transparent electrode bars.

The second transparent electrode layer 707 can be created by attaching to the common physical structure multiple transparent electrode bars that are vertical to the electrode bars in the first transparent electrode layer 703. Vertical electrode bar 711 is an example of the transparent electrode bars in the second transparent electrode layer 707. Each of the vertical electrode bars and the horizontal electrode bars can be made of Indium tin oxide (ITO) or titanium dioxide (TiO2).

Each vertical electrode bar at the layer 707 can cross each horizontal electrode bar at the layer 703. A section where a vertical electrode bar and a horizontal electrode bar cross each other corresponds to a pixel area on the liquid crystal layer 705. The pixel area on the liquid crystal layer 705 is the segmented area on the spatial filter 700 that can be dynamically turned on and turned off.

FIG. 7B shows such a segmented area 715, an area on the liquid crystal layer 705 that corresponds to the area where the horizontal electrode bar 713 and the vertical electrode bar 711 cross each other.

In one embodiment, to turn on the segmented area 715, the controlling unit 107 as shown in FIG. 2 can apply a first voltage (e.g., 10 V) to the horizontal electrode bar 713, and apply a second voltage (e.g., −10 V) to the vertical electrode bar 711. The difference between the two voltages would transform the liquid crystal at the segmented area 715 into a capacitor. Due to the temporary presence of the capacitor, the polarization of laser pulses that pass through the segmented area 715 can remain unchanged. As a result, the liquid crystal at the segmented area 715 can function as a high optical transmission area (i.e., an aperture) on the spatial filter 700. When the first voltage is applied to the horizontal electrode bar 713 and the second voltage is applied to each vertical electrode bar in the layer 707, a whole row of segmented areas can be turned on to function as an aperture corresponding to a vertical steering angle.

To turn off the segmented area 713 that has been turned on in the manner described above, the voltages applied to the horizontal electrode bar 713 and the vertical electrode bar in the layer 711 can be stopped. Without a voltage applied to the horizontal electrode bar 713, the polarization of an incoming beam of laser pulses can be configured to be rotated by 90 degrees by the liquid crystal in the segmented area 713 after passing the first polarizer layer 710. The beam of laser pulses whose polarization has been rotated by 90 degrees would be blocked by the second polarizer layer 709.

Similarly, a whole row of segmented areas can be turned off by stopping applying voltages to the electrode bars used to form the row of segmented areas. It would be appreciated by those skilled in the art that a segmented area would be in an off-state in the first place if no voltage is applied to a vertical electrode bar and to a horizontal electrode bar that forms the segmented area.

Figure 8:
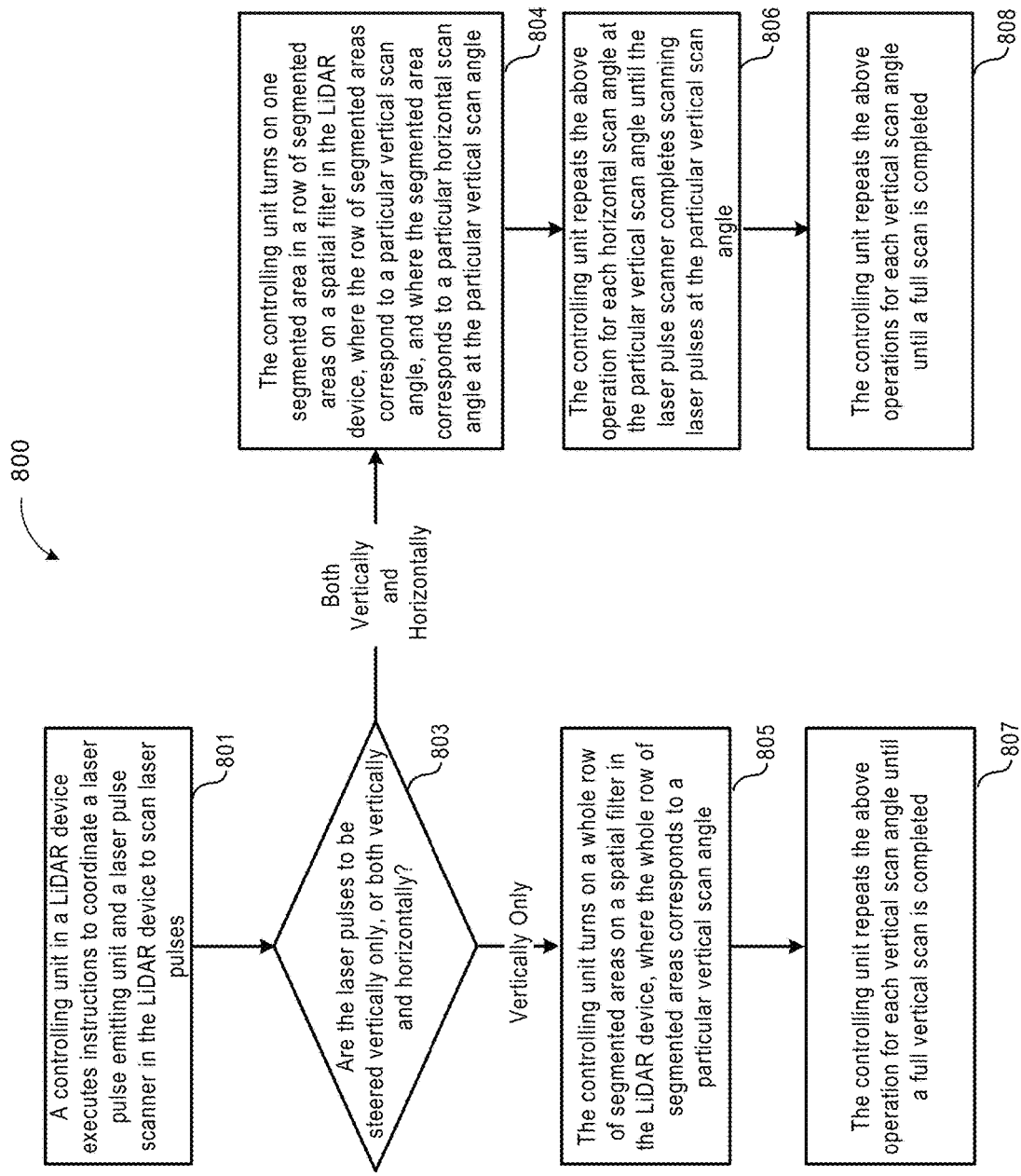
FIG. 8 illustrates an example of a process of rejecting noises in a LiDAR device in accordance with an embodiment.

FIG. 8 illustrates an example of a process of rejecting noises in a LiDAR device in accordance with an embodiment.

Process 800 can be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 800 can be performed by one or more of the controlling unit 107, the receiving pulse receiving unit 109, the laser pulse emitting unit 104, or the laser pulse scanner 105, as illustrated in FIGS. 2-6.

In operation 801, a controlling unit in a LiDAR device executes program instructions to coordinate a laser pulse emitting unit and a laser pulse scanner in the LiDAR device to steer laser pulses. The controlling unit can be programmed to either steer the emitted laser pulses only vertically, or both vertically and horizontally. Steering the laser pulses vertically only can increase the data throughput of the LiDAR device.

In operation 803, the controlling unit can determine a next operation based on whether the laser pulses are steered vertically only, or both vertically and horizontally.

In operation 805, in response to the laser pulses being steered vertically only, the controlling unit can execute instructions to turn on a whole row of segmented areas on a spatial filter in the LiDAR device, where the whole row of segmented areas corresponds to a particular vertical steering angle.

In operation 807, still referring to the "vertically only" steering approach, the controlling unit can repeat the operation 805 for each vertical steering angle until a full vertical scan is completed and a 3-D point cloud is generated.

In operation 804, in response to the laser pulses being steered both vertically and horizontally, the controlling unit executes instructions to turn on one segmented area in a row of segmented areas on a spatial filter in the LiDAR device. The row of segmented areas can correspond to a particular vertical steering angle, and the segmented area can correspond to a particular horizontal steering angle at the particular vertical steering angle.

In operation 806, still referring to the approach where the laser pulses are steered both vertically and horizontally, the controlling unit repeats the operation 804 for each horizontal steering angle at the particular vertical steering angle until the laser pulse scanner completes scanning laser pulses at the particular vertical steering angle.

In operation 808, the controlling unit repeats the above operations 804 and 805 for each vertical steering angle until a full scan is completed and a 3-D point cloud is generated.

Figure 9:
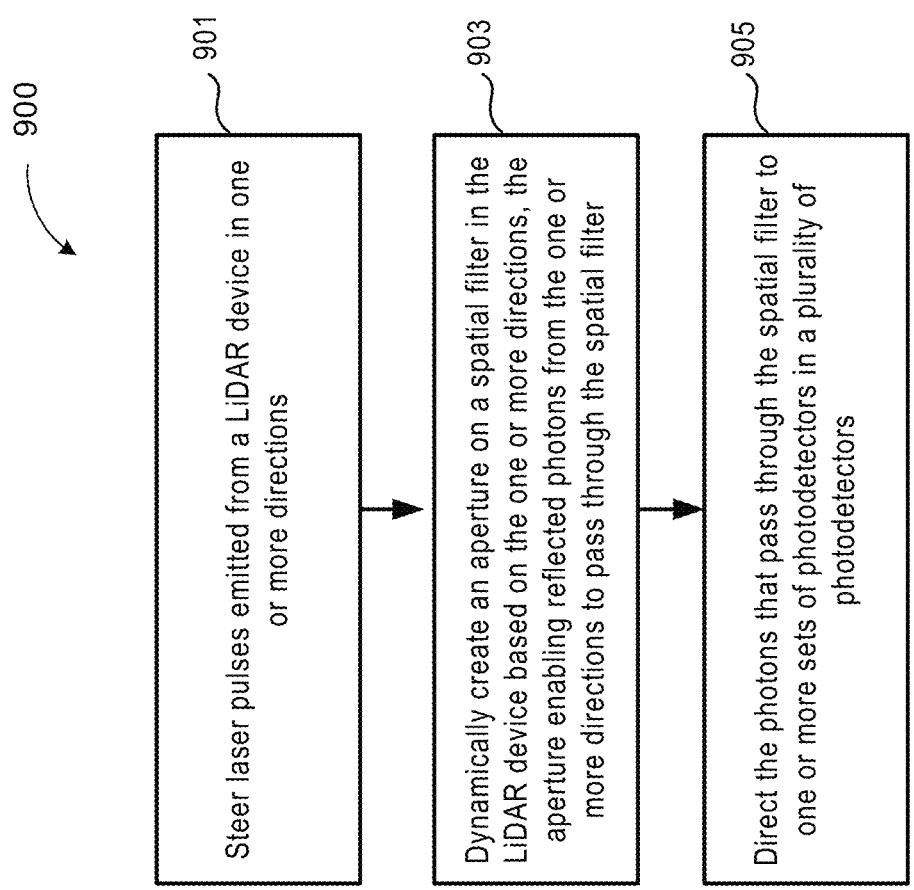
FIG. 9 illustrates another example of a process of rejecting noises in a LiDAR device in accordance with an embodiment.

FIG. 9 illustrates another example of a process of rejecting noises in a LiDAR device in accordance with an embodiment.

Process 900 can be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 900 can be performed by one or more of the controlling unit 107, the receiving pulse receiving unit 109, the laser pulse emitting unit 104, and the laser pulse scanner 105, as illustrated in FIGS. 2-6.

Referring to FIG. 9, in operation 901, a LIDAR device steers laser pulses in one or more directions. Each of the one or more steering directions can be a particular combination of a vertical steering angle and a horizontal steering angle of the LiDAR device. The number of directions depends on whether the LiDAR device steers emitted laser pulses only vertically or both vertically and horizontally.

In operation 903, the LiDAR device dynamically creates an aperture on a spatial filter based on the one or more directions, the aperture enabling reflected photons from the one or more directions to pass through the spatial filter. In one aspect of the dynamic nature of the aperture creation, the position of the aperture is not fixed; instead, the position changes as the steering directions of the LiDAR device changes. In another aspect of the dynamic nature of the aperture creation, the size or the number of pixels corresponding to the aperture is also changed based on the manner the emitted laser pulses from the LiDAR device are steered.

For example, when the emitted laser pulses are steered vertically only, a different row on the spatial filter can be turned on to constitute the aperture as the LiDAR device changes its vertical steering angles. When the emitted laser pulses are steered both vertically and horizontally, an aperture corresponding to a single pixel can be turned on. In this case, the aperture can correspond to a segmented area on an LCD or one digital mirror in a digital mirror based implementation.

The timing of steering laser pulses in the one or more directions can be coordinated by a controlling unit in the LiDAR device, such that the corresponding aperture can be created on the spatial filter.

In operation 905, the photons that pass through the spatial filter are to be directed to one or more sets of photodetectors in a plurality of photodetectors. The plurality of photodetectors can be arranged in a 2-D pixel array with each column including a number of vertically connected SPADs. Each column of SPADs is configured or programmed to detect signals from one steering direction at any given time.

Note that some or all of the components as shown and described above may be implemented in software, hardware, or a combination thereof. For example, such components can be implemented as software installed and stored in a persistent storage device, which can be loaded and executed in a memory by a processor to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Benefits of the Dynamic Spatial Filter

As described above, the performance of a LiDAR device is determined by its SNR, which can be impacted by different types of noises, including ambient light and electronic noise.

Unwanted ambient light reaching the detector of the LiDAR device primarily comes from the sun, and other sources of light in the environment. Ambient light intensity varies depending on the brightness of the day and the reflectivity of the surroundings. Ambient light can create a direct current (DC) bias on the photodetector to create white noise that is difficult to be filtered out. Because the power of the transmitted energy to produce information about a target object needs to be kept below a certain level to be safe, the ambient illumination reaching the detector can generate noise that overshadows the return laser pulses, thus limiting the LiDAR device from detecting objects at long distances.

Electronic noise includes all the noise generated by electronic circuits after the electrons are converted to a voltage. An example of electronic noise is shot noise that results from the uncertainty of when individual electrons are able to cross a threshold of a p-n junction. For a SPAD-based photodetector, electronic noise can be manifested as dark counts. The level of the dark counts, which depends on the area of the detector and fabrication technology employed to make the photodetector, is generally less frequent than random counts induced by ambient illumination.

For example, the optical power of ambient illumination reaching a single photodetector $P_B$ is given by the following equation:

$$P_B = I_S \rho_T A_L \left(\frac{\phi_D}{2}\right)^2 F_B \tag{1}$$

In the above equation, $I_S$ is the solar spectral irradiance in the unit of W/(m²·nm), where $\rho_T$ is the Lambertian reflectivity of the target, $A_L$ is the effective receiver pupil area, $\phi_D$ is the field of view of the photodetector, and $F_B$ is the bandwidth of the optical bandpass filter.

Under the bright sunlight, the illumination level can be about 70 klux or approximately 200 mW/(m² nm) in the wavelength of 900 nm. For a detection system with a focal length of 20 mm, optical bandpass filter of 40 nm, and a target reflectivity of 8%, the ambient illumination intensity received by a 20×20 µm² detection area is $P_B$=64 pW. Given photon detection efficiency of 2%, the photon count due to ambient illumination is approximately 5 MHz, 500 times higher of electronic noise of the receiver.

When implementing a solid-state LiDAR detection device, the receiver light collection area, which is determined by the photodetector size and the acceptance angle of the photodetector, can be an important parameter, as it relates to number of photons that LiDAR device can collect.

However, the photodetector size is directly related to the receiver pupil and the receiver field-of-view. A larger receiver pupil means that more returning laser beams could be gathered and that a longer detection range could be potentially achieved, and a wider field-of-view also means that more returning laser beams could be potentially collected. However, the photodetector area needs to be increased proportionally to maintain the same FOV of the receiver. Increasing the photodetector area, in turn, would increase ambient illumination, resulting in a degraded SNR.

Therefore, reducing ambient light is a more desired way of increase the SNR of a LiDAR device. The dynamic spatial filter described above can reduce ambient illumination in the receiver of a LiDAR device by allowing returning signals and noises coming from one or more known directions to pass while rejecting ambient light from other directions. By reducing illumination in the receiver, the dynamic spatial filter can also reduce shot noise to a negligible level compared to other noises from components in the LiDAR device. The capability of dynamic spatial filtering to improve performance of the solid state LiDAR device is directly related to the extinction coefficient, pattern refresh rate, and the optical efficiency.

In the simplest form, the ambient illumination power received by the photodetector $P_D$ can be given by $$P_D = I_B \eta_T A_P + I_R \quad (2)$$

In Equation (2), $I_B$ is the total optical intensity of ambient illumination reaching the dynamic spatial filter, $A_P$ is the area of the spatial filter where the light is unblocked, and $\eta_T$ is the optical efficiency of transferring photons from the dynamic spatial filter to the subsequent photodetector.

For an ideal dynamic spatial filter, no light in the blocked region of the spatial filter can reach the photodetector. However, most practical devices leak a small amount of the ambient illumination. $I_R$ is the residue ambient illumination that reaches the photodetector through the blocked area of the filter. For a reflective dynamic spatial filter (e.g., MEMS Mirror-based spatial filter), the residue ambient illumination occurs typically due to scattering and diffraction. For a transmissive spatial filter (e.g., a LCD-based spatial filter), the residue ambient illumination is a result of non-zero transmission through the blocked region of the filter. The optical relay system also contributes to the amount of residue ambient illumination. Generally, $I_R$ can be linearly related to $I_B$ by $\varepsilon_B I_B A_L$ where $\varepsilon_B$ is the extinction coefficient, or contrast performance of the dynamic spatial filtering system.

Equation (2) shows that the ability of the spatial filter to reject ambient light improves as the dynamic aperture on the filter decreases in dimensions. Under the full sunlight condition, the spatial filter can increase the SNR of the LiDAR device by up to 28 dB. The SNR improvement can be utilized to increase the target range, resolution, field of view, or frame rate or a combination of these specifications of the LiDAR device. The ability of the dynamic spatial filter can be limited by the pattern refresh rate, since the rate of laser pulses is significantly faster than the pattern refresh rate.

Some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

All of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A light detection and ranging (LiDAR) device, comprising:
   a photodetector array that comprises a plurality of photodetectors;
   a spatial filter positioned before the photodetector array and including a plurality of segmented areas;
   a laser pulse scanner configured to steer laser pulses in a plurality of steering directions, wherein each of the plurality of steering directions corresponds to a different segmented area or a different sequence of segmented areas in the plurality of segmented areas on the spatial filter; and
   a controlling unit configured to dynamically create an aperture on the spatial filter by turning on a segmented area or a sequence of segmented areas that corresponds to a current steering direction of the plurality of steering directions;
   wherein when the segmented area or the sequence of segmented areas that corresponds to the current steering direction is in an on state, each of the rest of the plurality of segmented areas is in an off state such that photons reflected from the current steering direction pass through the spatial filter only through the aperture.

2. The LiDAR device of claim 1, wherein each of the plurality of steering directions correspond to a different segmented area on the spatial filter when the laser pulse scanner steers the laser pulses both horizontally and vertically, and correspond to a different sequence of segmented areas when the laser pulse scanner steers the laser pulses vertically or horizontally.

3. The LiDAR device of claim 1, wherein each sequence of segmented areas is a row of segmented areas or a column of segmented areas on the photodetector array.

4. The LiDAR device of claim 1, wherein each of the plurality of photodetectors is a single-photon avalanche diode (SPAD).

5. The LiDAR device of claim 4, wherein photons that pass through each sequence of segmented areas of the plurality of segmented areas are configured to be incident on two or more blocks of photodetectors of the plurality of photodetectors, and wherein photons that pass through any one of the plurality of segmented areas are configured to be incident on one block of photodetectors of the plurality of photodetectors.

6. The LiDAR device of claim 5, wherein the photodetector array is a two-dimensional pixel array, wherein each of the two or more blocks of photodetectors represents a column of vertically connected SPADs in the two-dimensional pixel array, wherein each SPAD in the column of vertically connected SPADs is individually addressable.

7. The LiDAR device of claim 1, wherein the spatial filter is based on one of an electrochromic display, an array of micromechanical (MEMS) mirrors, a liquid crystal display (LCD), or an electro-wetting display.

8. The LiDAR device of claim 1, wherein the photons that pass through the aperture include photons reflected from laser pulses and noise, wherein the noise includes photons that do not stem from the laser pulses.

9. The LiDAR device of claim 8, wherein the controlling unit is to reject the noise in the photons that passes through the aperture based on one or more fixed temporal patterns specific to laser pulses emitted by the LiDAR device.

10. The LiDAR device of claim 1, further comprising:
    one or more optical elements positioned before the spatial filter; and
    an optical relay lens positioned after the spatial filter;
    wherein the one or more optical elements are to focus the photons reflected from the current steering direction to the aperture;
    wherein the optical relay lens is to project the photons that pass through the aperture as one or more laser stripes onto the plurality of photodetectors.

11. A method of rejecting noise in a light detection and ranging (LiDAR) device, wherein the LiDAR device includes a photodetector array with a plurality of photodetectors and a spatial filter positioned before the photodetector array, wherein the spatial filter comprises a plurality of segmented areas, the method comprising:
    receiving reflected photons from a plurality of steering directions in which laser pulses are steered by a laser pulse scanner, wherein each of the plurality of steering directions corresponds to a different segmented area or a different sequence of segmented areas in the plurality of segmented areas on the spatial filter;
    dynamically creating an aperture on the spatial filter by turning on the a segmented area or a sequence of segmented areas that corresponds to a current steering direction of the plurality of steering directions, wherein when the segmented area or the sequence of segmented areas that corresponds to the current steering direction is in an on state, each of the rest of the plurality of segmented areas is in an off state such that photons reflected from the current steering direction pass through the spatial filter only through the aperture; and
    directing photons that pass through the aperture to the plurality of photodetectors.

12. The method of claim 11, wherein each of the plurality of steering directions corresponds to a different segmented area on the spatial filter when the laser pulse scanner steers the laser pulses both horizontally and vertically, and corresponds to a different sequence of segmented areas when the laser pulse scanner steers the laser pulses vertically or horizontally.

13. The method of claim 11, wherein each sequence of segmented areas is a row of segmented areas or a column of segmented areas on the photodetector array.

14. The method of claim 11, wherein each of the plurality of photodetectors is a single-photon avalanche diode (SPAD).

15. The method of claim 14, wherein photons that pass through each sequence of segmented areas of the plurality of segmented areas are configured to be incident on two or more blocks of photodetectors of the plurality of photodetectors, and wherein photons that pass through any one of the plurality of segmented areas are configured to be incident on one block of photodetectors of the plurality of photodetectors.

16. The method of claim 15, wherein the photodetector array is a two-dimensional pixel array, wherein each of the two or more blocks of photodetectors represents a column of vertically connected SPADs in the two-dimensional pixel array, wherein each SPAD in the column of vertically connected SPADs is individually addressable.

17. The method of claim 11, wherein the spatial filter is based on one of an electrochromic display, an array of micromechanical (MEMS) mirrors, a liquid crystal display (LCD), or an electro-wetting display.

18. The method of claim 11, wherein the photons that pass through the aperture include photons reflected from laser pulses and noise, wherein the noise includes photons that do not stem from the laser pulses.

19. The method of claim 18, wherein the noise in the photons that passes through the aperture is rejected based on one or more fixed temporal patterns specific to laser pulses emitted by the LiDAR device.

20. A circuit embedded in a light detection and ranging (LiDAR) device, wherein the LiDAR device includes a photodetector array with a plurality of photodetectors and a spatial filter positioned before the photodetector array, wherein the circuit is configured to cause the LiDAR device to perform operations comprising:

receiving reflected photons from a plurality of steering directions in which laser pulses are steered by a laser pulse scanner, wherein each of the plurality of steering directions corresponds to a different segmented area or a different sequence of segmented area in the plurality of segmented areas on the spatial filter;

dynamically creating an aperture on the spatial filter by turning on a segmented area or a sequence of segmented areas that corresponds to a current steering direction of the plurality of steering directions, wherein when the segmented area or the sequence of segmented areas that corresponds to the current steering direction is in an on state, each of the rest of the plurality of segmented areas is in an off state such that photons reflected from the current steering direction pass through the spatial filter only through the aperture; and directing photons that pass through the aperture to the plurality of photodetectors.

* * * * *